(12) United States Patent
McHugh et al.

(10) Patent No.: US 9,151,130 B2
(45) Date of Patent: Oct. 6, 2015

(54) SYSTEM FOR CONTROLLING TEMPERATURE OF SUBSEA EQUIPMENT

(75) Inventors: Edmund Peter McHugh, County Longford (IE); Kevin Peter Minnock, County Longford (IE); David Francis Anthony Quin, Limerick (IE)

(73) Assignee: Cameron International Corporation, Houston, TX (US)

(*) Notice: Subject to any disclaimer, the term of this patent is extended or adjusted under 35 U.S.C. 154(b) by 833 days.

(21) Appl. No.: 13/365,212

(22) Filed: Feb. 2, 2012

(65) Prior Publication Data

US 2013/0199615 A1 Aug. 8, 2013

(51) Int. Cl.
| | | |
|---|---|---|
| E21B 36/00 | (2006.01) |
| E21B 33/035 | (2006.01) |
| F16K 49/00 | (2006.01) |
| G05D 7/06 | (2006.01) |
| G05D 23/19 | (2006.01) |

(52) U.S. Cl.
CPC ............... *E21B 33/035* (2013.01); *E21B 36/00* (2013.01); *E21B 36/001* (2013.01); *E21B 36/003* (2013.01); *E21B 36/005* (2013.01); *F16K 49/005* (2013.01); *G05D 7/0635* (2013.01); *G05D 23/1917* (2013.01); *Y10T 137/0318* (2015.04); *Y10T 137/6416* (2015.04)

(58) Field of Classification Search
CPC ..... E21B 36/00; E21B 36/001; E21B 36/003; E21B 36/005; F16K 49/005
USPC ........ 137/79, 81.2, 236.1, 340, 375; 166/335, 166/356
See application file for complete search history.

(56) References Cited

U.S. PATENT DOCUMENTS

| | | | | | |
|---|---|---|---|---|---|
| 3,901,269 | A | * | 8/1975 | Henderson | 137/340 |
| 3,916,941 | A | * | 11/1975 | Usry | 137/340 |
| 4,650,151 | A | * | 3/1987 | McIntyre | 251/14 |
| 4,715,400 | A | * | 12/1987 | Gardner et al. | 137/341 |
| 6,321,779 | B1 | * | 11/2001 | Miller et al. | 137/340 |
| 2003/0010499 | A1 | | 1/2003 | Qvam et al. | |
| 2010/0243077 | A1 | * | 9/2010 | Grimseth et al. | 137/468 |

FOREIGN PATENT DOCUMENTS

| | | |
|---|---|---|
| GB | 2269876 | 2/1994 |
| WO | WO 2010120184 A1 * | 10/2010 |

OTHER PUBLICATIONS

International Search Report & Written Opinion for Application No. PCT/US2012/063758 mailed Jan. 14, 2014.

* cited by examiner

*Primary Examiner* — Kevin Murphy
(74) *Attorney, Agent, or Firm* — Fletcher Yoder, P.C.

(57) ABSTRACT

An underwater assembly includes a flow control device and an actuator coupled to the flow control device, where the actuator is configured to actuate the flow control device. The underwater assembly further includes an insulated housing surrounding the flow control device and the actuator, where the insulated housing is configured to retain heat. The underwater assembly also includes a thermal control system comprising a heat exchanger configured to control a temperature of the actuator.

21 Claims, 4 Drawing Sheets

SYSTEM FOR CONTROLLING TEMPERATURE OF SUBSEA EQUIPMENT

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A variety of subsea equipment, such as mineral extraction equipment, may be subjected to high temperatures and low temperatures. For example, mineral extraction equipment, such as valves, actuators, and other flow control mechanisms, may experience elevated temperatures as fluids flow through the equipment. In addition, the sea water is often very cold at locations of the mineral extraction equipment, thereby subjecting the equipment to cold temperatures in addition to the elevated temperatures. Unfortunately, hot and cold extremes may subject the equipment to thermal stress, damage, or failure. For example, certain electronics and/or actuators may eventually fail at extreme temperatures or as a result of thermal cycles. Accordingly, a need exists to maintain temperature within an acceptable range to reduce the possibility of damage or failure.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

Figure 1:
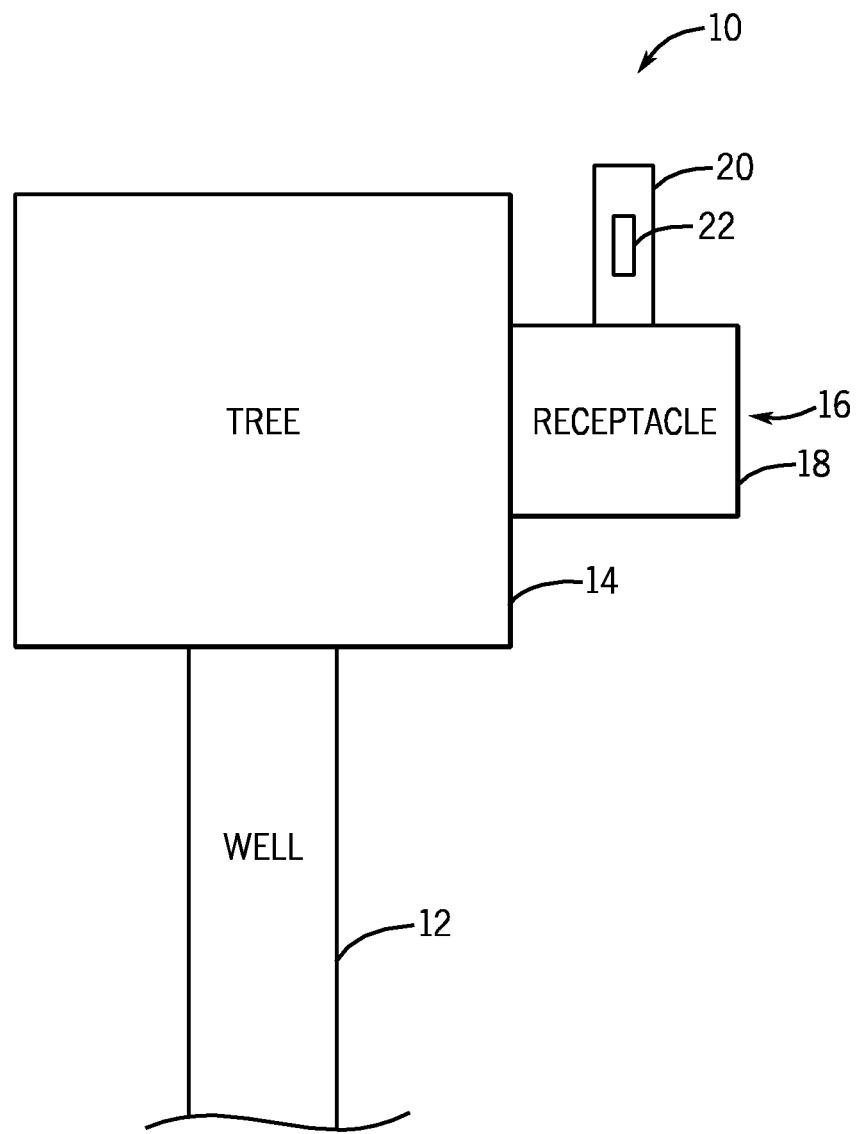
FIG. 1 is a sub-sea BOP stack assembly, which may include one or more thermal control systems configured to control a temperature of an actuator coupled to a flow control device.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

In the embodiments discussed in detail below, a thermal control system is configured to control the temperature in subsea equipment. For example, the thermal control system may be disposed in subsea insulated structures having pipes or conduits running through the insulated structures. The pipes may route various system or operating fluids to for from a well. For example, the fluids may include production oil from the well, and thus may be heated. The pipes may further include flow valves, chokes, and so forth, within the insulated structures. In addition to the fluid pipes and other conduits, the insulated structures are filled with sea water. As heated fluids (e.g., production oil) are routed through the pipes, the sea water within the insulated structures absorbs heat transferred from the fluids flowing through the pipes. Additionally, the insulated structures retain the heat absorbed by the sea water, thereby substantially blocking release of the heat and energy generated by the subsea system into the surrounding sea environment. The heat retained in the insulated structures further operates to substantially reduce formation of hydrates in the choke and/or flow lines. The insulated structures may further include actuators configured to operate the flow valves, chokes, and so forth. Additionally, the actuators may have electronic assemblies, processors, memory circuits, and mechanical components such as seals and gear oils that are heat sensitive. Without the disclosed thermal control system, due to the heat transferred to the actuators by the pipes and flow control devices and retained by the insulated structures, the actuators may reach temperatures that cause the electronics assemblies and heat sensitive mechanical components to malfunction and fail. Accordingly, the disclosed thermal control system is configured to maintain the temperature in the insulated structure within a suitable temperature range to improve performance and prevent thermal damage of the actuator, flow control device, and other equipment in the insulated structure.

As discussed below, the disclosed thermal control system may have a variety of features to control the temperature in the subsea equipment. For example, the thermal control system may include a thermostat coupled to a heat exchanger. The heat exchanger may be coupled to an actuator which is configured to regulate the operation of a flow control device. Specifically, the heat exchanger may be coupled to inlet and outlet ports of the insulated structure to enable a flow of exterior sea water (i.e., cold sea water outside the insulated structure) through the heat exchanger, thereby lowering the temperature of the actuator and the interior sea water within the insulated structure surrounding the actuator. The thermostat is configured to control the flow of exterior sea water through the heat exchanger based on temperature feedback, such as a sensed temperature of the interior sea water or the actuator. For example, the thermostat may trigger a valve to open if the temperature exceeds an upper threshold temperature, and the thermostat may trigger the valve to close if the temperature drops below a lower threshold temperature. In certain embodiments, the valve may be disposed at the outlet port.

Upon opening the valve, natural convection and buoyancy differences between heated sea water within the heat exchanger and cold sea water surrounding the insulated structure cause the heated sea water within the heat exchanger to escape the heat exchanger, thereby flowing to the lower temperature environment (i.e., the sea water surrounding the insulated structure). Furthermore, as mentioned above, the insulated structure includes an inlet port coupled to the heat exchanger, allowing cold sea water surrounding the insulated structure to enter the heat exchanger. The cold sea water flowing into the heat exchanger absorbs heat from the actuator, thereby lowering the temperature of the actuator and the sea water surrounding the actuator. Once the temperature of the actuator decreases to a certain level, the thermostat triggers the valve to close. With the valve closed, the actuator within the insulated structure begins to reheat from heat transferred by the fluids flowing through the pipes and flow control device within the insulated structure. Thus, the thermostat may trigger the valve to selectively open and close to flow the exterior sea water through the heat exchanger, thereby maintaining the temperature of the actuator within a suitable temperature range.

The thermal control system may be used in various types of equipment. For instance, FIG. 1 depicts an exemplary resource extraction system 10 that includes a well 12, what is colloquially referred to as a "christmas tree" 14 (hereinafter, a "tree"), and a receptacle 16. The illustrated resource extraction system 10 can be configured to extract hydrocarbons (e.g., oil and/or natural gas). In some embodiments, the resource extraction system 10 may be disposed in a subsea environment and/or configured to extract or inject other substances, such as those discussed above.

When assembled, the tree 14 couples to the well 12 and includes a variety of valves, fittings, and controls for operating the well 12. For example, the receptacle 16 may be in fluid communication with the well 12 and may be configured to house a flow control device, such as a choke or other valve. In the illustrated embodiment, the receptacle 16 includes an insulated structure 18 (e.g., a choke body) having an insulation cap 20 and an insert 22. In certain embodiments, the flow control device within the receptacle 16 may be configured to regulate the flow of a chemical through the tree 14 and into the well 12. In other embodiments, the receptacle 16 and flow control device may be positioned on a manifold of the resource extraction system 10. As discussed in detail below, the flow control device may include a thermal control system configured to control the temperature of an actuator of the flow control device.

Figure 2:
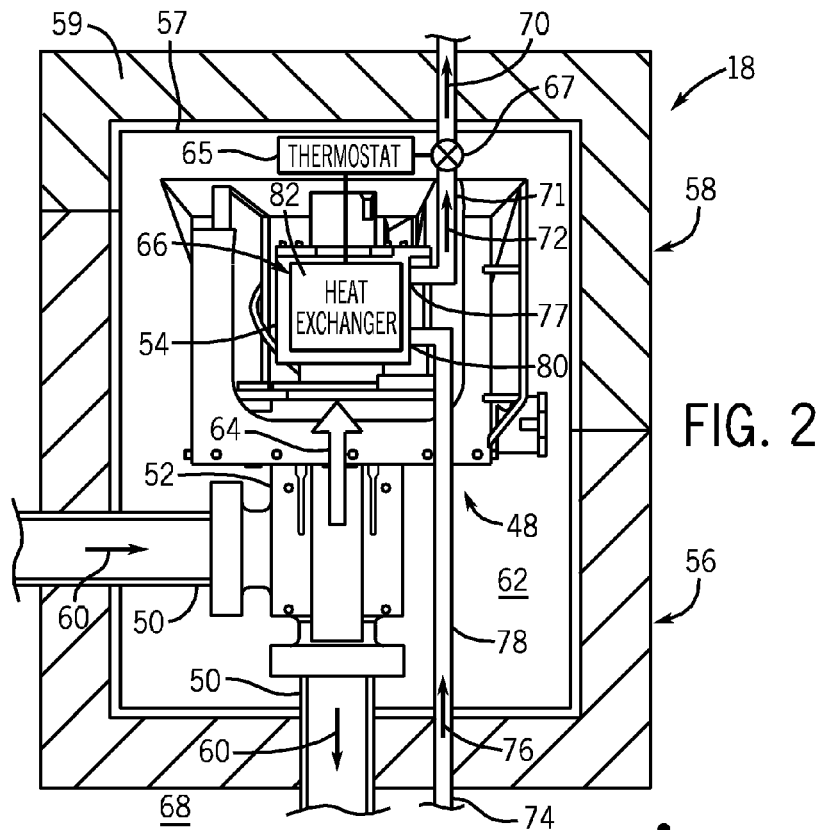
FIG. 2 is an embodiment of a subsea insulated structure having a thermal control system configured to control a temperature of an actuator coupled to a flow control device.

FIG. 2 is a schematic of an embodiment of one of the insulated structures 18 of FIG. 1 having a thermal control system 48. The illustrated embodiment shows pipes 50 passing through the insulated structure 18. Fluid flow through the pipes 50 is regulated by a flow control device 52, which is operated by an actuator 54. As shown, the insulated structure 18 includes the thermal control system 48 configured to regulate a temperature of the actuator 54. In the illustrated embodiment, the insulated structure 18 has a body 56 and a lid 58. Additionally, the insulated structure 18 has a wall 57 with an insulative layer 59. As discussed above, the insulated structure 18 serves to retain heat and energy within the insulated structure 18. For example, at times when the BOP package 28 is shut down, the insulative structure 18 may retain energy and/or heat within the insulative structure 18 to reduce unnecessary energy and/or heat loss from the BOP package 28. Additionally, the heat retained by the insulated structure 18 may reduce the formation of hydrates within the pipes 50 and the flow control device 52.

The pipes 50 flow a fluid 60, such as a system or operating fluid, which may be heated. For example, the fluid 60 may be a production oil from the well. As mentioned above, the pipes 50 also include the flow control device 52. For example, the flow control device 52 may be a valve or a choke and may be configured to regulate a flow rate of the fluid 60 through the pipes 50. The insulated structure 18 is also filled with interior sea water 62, which surrounds the thermal control system 48, the pipes 50, the flow control device 52, and the actuator 54. As discussed above, the interior sea water 62 absorbs heat from the fluid 60 flowing through the pipes 50. Consequently, the interior sea water 62 gradually increases in temperature while heated fluid 60 flows through the pipes 50. Similarly, the temperature of the interior sea water 62 rises due to the insulated structure 18 retaining the heat transferred from the heated fluid 60 flowing through the pipes 50. For example, absent any temperature regulation in the insulated structure 18, the interior sea water 62 may reach temperatures of approximately 120° F., 130° F., 140° F., 150° F., 160° F., 170° F., 180° F., 190° F., 200° F., 210° F., 220° F., 230° F., 240° F., 250° F., or more.

As shown, the interior sea water 62 within the insulated structure 18 surrounds the actuator 54, which may include heat sensitive components such as electronics, seals, and gear oil. As the temperature of the interior sea water 62 increases, the actuator 54 and its components also increases. Similarly, heat from the fluid 60 flowing through the pipes 50 may be conducted through the flow control device 52 to the actuator 54, as indicated by arrow 64. As the actuator 54 and its components absorb heat from the interior sea water 62 and the flow control device 52, the actuator 54 may reach temperatures that can cause heat sensitive components of the actuator 54 to fail without the presently disclosed thermal control system 48. For example, without the present disclosed thermal control system 48, the actuator 54 and its components may begin to fail if the temperature of the actuator 54 is greater than approximately 100° F., 110° F., 120° F., 130° F., 140° F., or 150° F.

To regulate the temperature of the actuator 54, the insulated structure 18 includes the thermal control system 48. In the illustrated embodiment, the thermal control system 48 includes a thermostat 65 coupled to a heat exchanger 66 and a valve 67. The heat exchanger 66 is coupled to the actuator 54 and/or the flow control device 52 to maintain the temperature within a suitable range. In other embodiments, the heat exchanger 66 may be coupled to other components within the insulated structure 18. As described in detail below, the heat exchanger 66 may include a variety of configurations, such as a coil, plate, or jacket heat exchanger 66. Once the actuator 54 reaches a predefined elevated temperature (e.g., an upper threshold temperature), the thermal control system 48 operates to circulate exterior sea water 68 (i.e., sea water outside the insulated structure 18) through the heat exchanger 66, thereby transferring heat from the actuator 54 to the exterior sea water 68. Specifically, the thermal control system 48 includes the thermostat 65, which may include one or more temperature sensors, configured to monitor the temperature of the actuator 54. Once the actuator 54 reaches the predefined elevated temperature, the thermostat 65 of the thermal control system 48 actuates the valve 67 to open an exit port 70, allowing heated water within the heat exchanger 66 to exit the heat exchanger 66. As mentioned above, natural convection and buoyancy differences between heated sea water within the heat exchanger 66 and the exterior sea water 68 surrounding the insulated structure 18 cause the heated sea water within the heat exchanger 66 to escape the heat exchanger 66 through an exit conduit 71 extending between an outlet 77 of the heat exchanger 66 and the exit port 70, as indicated by arrow 72.

To replace the sea water that exits the heat exchanger 66 through the exit port 70, exterior sea water 68 (i.e., sea water from outside the insulated structure 18) enters the heat exchanger 66 through an inlet port 74. As indicated by arrow 76, the exterior sea water 68 flows through an inlet conduit 78 extending between an inlet 80 of the heat exchanger 66 and the inlet port 74. More specifically, as sea water exits the heat exchanger 66 through the exit port 70, a vacuum is created within the heat exchanger 66. This vacuum generates a flow of exterior sea water 68 through the inlet port 74 and into the heat exchanger 66 (e.g., into a heat exchanger volume 82 of the heat exchanger 66). The exterior sea water 68 may have a temperature of approximately 35, 36, 37, 38, 39, or 40 degrees F. Therefore, as heated sea water exits the heat exchanger 66 and is replaced by exterior sea water 68, the heat exchanger 66 will absorb heat from the actuator 54. In other words, the temperature difference between the actuator 54 and the sea water within the heat exchanger 66 will cause heat from the actuator 54 to be transferred to the sea water within the heat exchanger 66. As discussed below, once the temperature of the actuator 54 cools to a certain level (e.g., a lower threshold temperature), the thermostat 65 of the thermal control system 48 operates to close the exit port 70 to block the flow of sea water from the heat exchanger 66 through the exit port 70.

Figure 3:
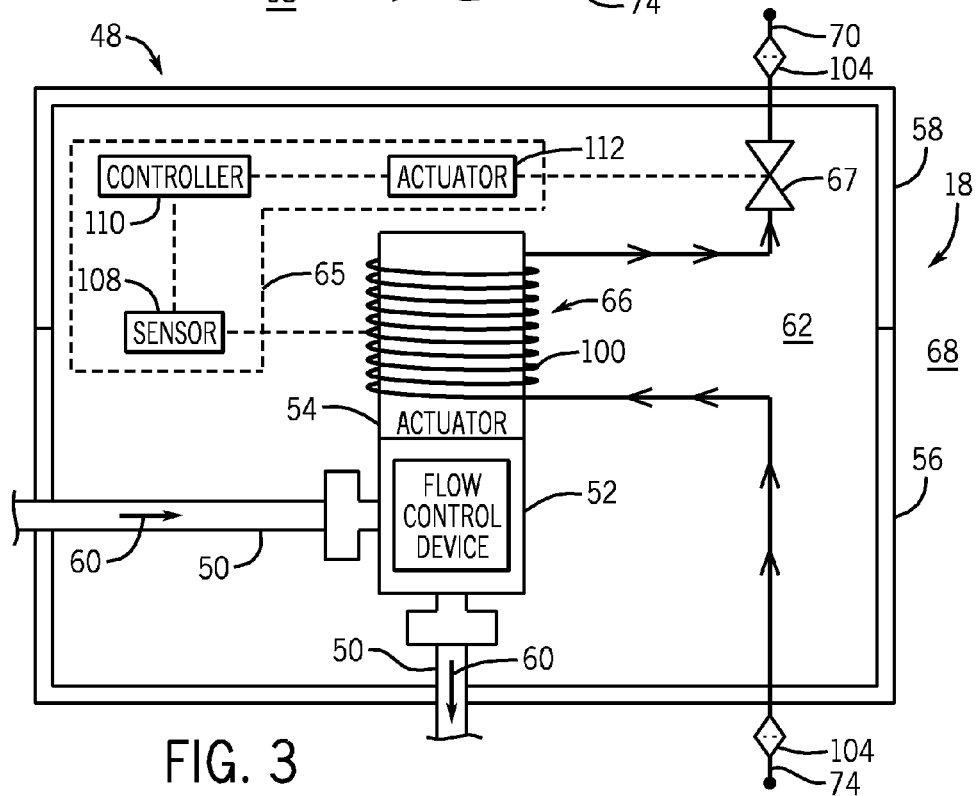
FIG. 3 is a schematic of an embodiment of a thermal control system configured to control a temperature of an actuator coupled to a flow control device.

FIG. 3 is a schematic of the insulated structure 18 having the thermal control system 48, illustrating the thermostat 65 coupled to the heat exchanger 66 and the valve 67. In the illustrated embodiment, the heat exchanger 66 comprises a coil 100. In certain embodiments, the coil 100 may be coupled to the actuator 54, while, in other embodiments, the coil 100 may be disposed about a perimeter of the actuator 54, but not physically coupled to the actuator 54. Furthermore, the coil 100 may be coupled to, or disposed about, another component or portion of the insulated structure 18. The coil 100 may be formed from metal tubing such as steel, copper, or the like. The thermal control system 48 the thermostat 65 and the valve 67 configured to regulate the flow through the heat exchanger 66, and thus the heat transfer away from the actuator 54. Additionally, the thermal control system 48 includes filters 104 disposed at the exit and inlet ports 70 and 74 of the thermal control system 48. As will be appreciated, the filters 104 may block entry of marine growth, such as vegetation or animals, into the heat exchanger 66. The illustrated embodiment includes similar elements and element numbers as the embodiment shown in FIG. 2.

As mentioned above, the thermostat 65 and the valve 67 are configured to circulate exterior sea water 68 through the heat exchanger 66 once the actuator 54 reaches a predetermined elevated temperature. Specifically, the thermostat 65 is configured to open and close the valve 67 at the exit port 70 of the thermal control system 48. In the illustrated embodiment, the thermostat 65 includes a sensor 108 coupled to the actuator 54. The sensor 108 is configured to monitor the temperature of the actuator 54. For example, the sensor 108 may be a thermocouple, infrared sensor, or optical sensor. The thermostat 65 also includes a controller 110 coupled to the sensor 108, and an actuator 112 coupled to the controller 110. In certain embodiments, the controller 110 may be a programmable logic controller (PLC) or a distributed control system (DCS). When the actuator 54 reaches the predefined elevated temperature, the sensor 108 detects the predefined elevated temperature and communicates the event to the controller 110. Thereafter, the controller 110 operates to engage the actuator 112, which is coupled to the valve 67. Specifically, when the sensor 108 indicated that the actuator 54 has reached the predefined elevated temperature (e.g., upper threshold temperature), the thermostat 65 (e.g., controller 110) triggers the actuator 112 to open the valve 67, thereby opening the exit port 70.

As mentioned above, with the exit port 70 opened, natural convection and buoyancy differences between the heated sea water within the coil 100 of the heat exchanger 66 and the exterior sea water 68 surrounding the insulated structure 18 cause the heated sea water within the coil 100 to escape the coil 100 through the exit port 70. As the heated sea water from the coil 100 escapes through the exit port 70, exterior sea water 68 from outside the insulated structure 18 enters the coil 100 of the heat exchanger 66 through the inlet port 74. In the manner discussed above, heat will transfer from the actuator 54 to the exterior sea water 68 that has entered the coil 100 through the inlet port 74, thereby lowering the temperature of the actuator 54. As sea water continues to flow through the coil 100 and absorb heat from the actuator 54, the actuator 54 will eventually cool to a predefined lowered temperature (e.g., lower threshold temperature). For example, the predefined lower temperature may be approximately 50 to 100, 60 to 90, or 70 to 80 degrees F. Once the sensor 108 indicates that the temperature of the actuator 54 has reached the predefined lowered temperature, the controller 110 operates to engage the actuator 112 and close the valve 67, thereby closing the exit port 70 and stopping the flow of sea water through the coil 100. With the exit port 70 closed, the sea water within the coil 100 will being to increase in temperature as the actuator 54 increases in temperature within the insulated structure 18. Eventually, the actuator 54 will reach the predefined elevated temperature again, and the thermal control system 48 will operate to cool the actuator 54 again, in the manner described above. In the manner described above, the thermal control system 48 can maintain the temperature of the actuator 54 within a suitable temperature range (e.g., between upper and lower threshold temperatures).

Figure 4:
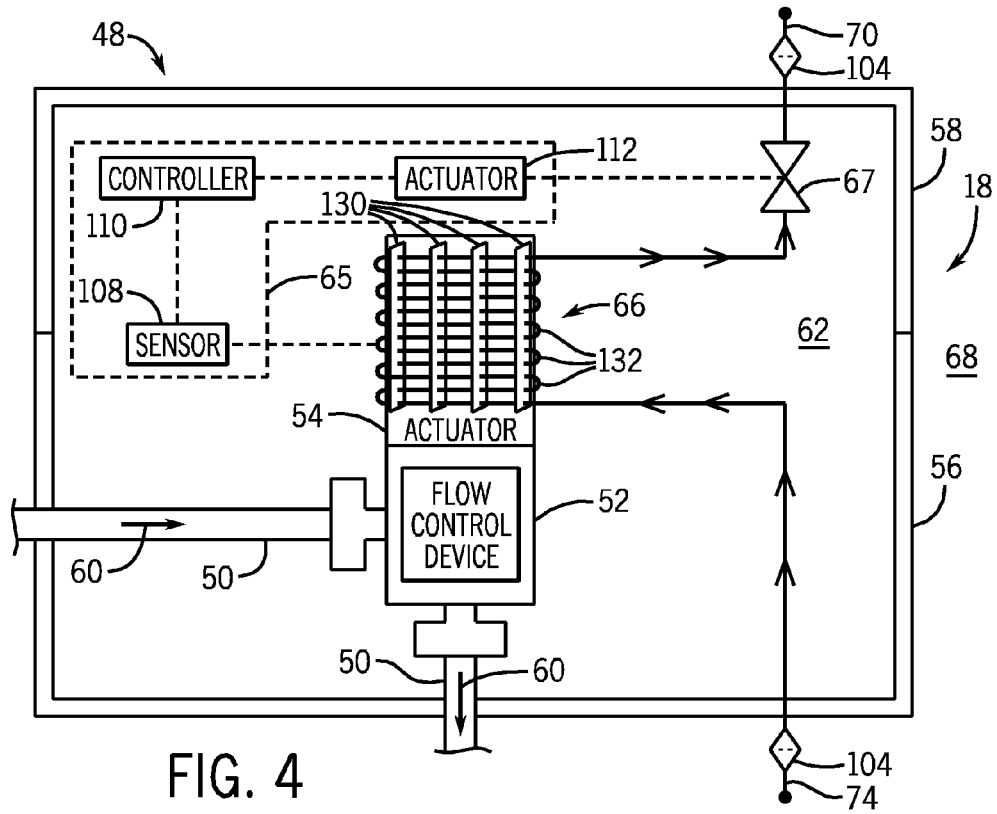
FIG. 4 is a schematic of an embodiment of a thermal control system configured to control a temperature of an actuator coupled to a flow control device.

FIG. 4 is a schematic of the insulated structure 18 having the thermal control system 48, illustrating a fin-type configuration of the heat exchanger 66. The illustrated embodiment includes similar elements and element numbers as the embodiment shown in FIG. 3. In the illustrated embodiment, the heat exchanger 66 comprises a plurality of fins 130 coupled to the actuator 54. For example, the fins 130 may be disposed about a perimeter of the actuator 54 and extend radially outward from the actuator 54. In certain embodiments, the fins 130 may be constructed from a metal, such as copper, steel, aluminum, or other material configured to conduct heat. Furthermore, while the illustrated embodiment shows four fins 130 coupled to the actuator 54, other embodiments of the heat exchanger 66 may include other numbers of fins 130. For example, the heat exchanger 66 may include approximately 1 to 50, 2 to 40, 3 to 30, 4 to 20 or 5 to 10 fins 130. Additionally, the heat exchanger 66 includes a conduit 132 extending from the inlet port 74 to the exit port 70. More specifically, the conduit 132 is coupled to and passes through the fins 130 secured to the actuator 54. As shown, the conduit 132 passes through each of the fins 130 multiple times. In other words, the conduit 132 winds back and forth through the fins 130. The conduit 132 may be metal tubing formed from a metal such as copper, steel, or aluminum.

In the manner described above, the thermostat 65 (e.g., controller 110) opens the valve 67 to open the exit port 70 when the actuator 54 reaches the predefined elevated temperature. The exterior sea water 68 enters the conduit 132 through the inlet port 74 and passes through the heat exchanger 66. In this manner, the sea water within the conduit 132 absorbs heat from the actuator 54. Specifically, as the temperature of the actuator 54 rises, heat from the actuator 54 is conducted to the fins 130. Subsequently, as sea water passes through the conduit 132 coupled to the fins 130, the temperature difference between the sea water flowing through the conduit 132 and the fins 130 will cause the sea water to absorb heat from the fins 130. As heat from the fins 130 is absorbed by the sea water flowing through the conduit 132, the temperature of the fins 132, and thereby the actuator 54, is lowered. As described above, once the actuator 54 reaches a predefined lowered temperature, the thermostat 65 (e.g., controller 110) closes the valve 67 to close the exit port 70, thereby stopping the flow of exterior sea water 68 through the conduit 132 of the heat exchanger 66. In this manner, the thermal control system 48 can maintain the temperature of the actuator 54 within a suitable temperature range (e.g., between upper and lower threshold temperatures).

Figure 5:
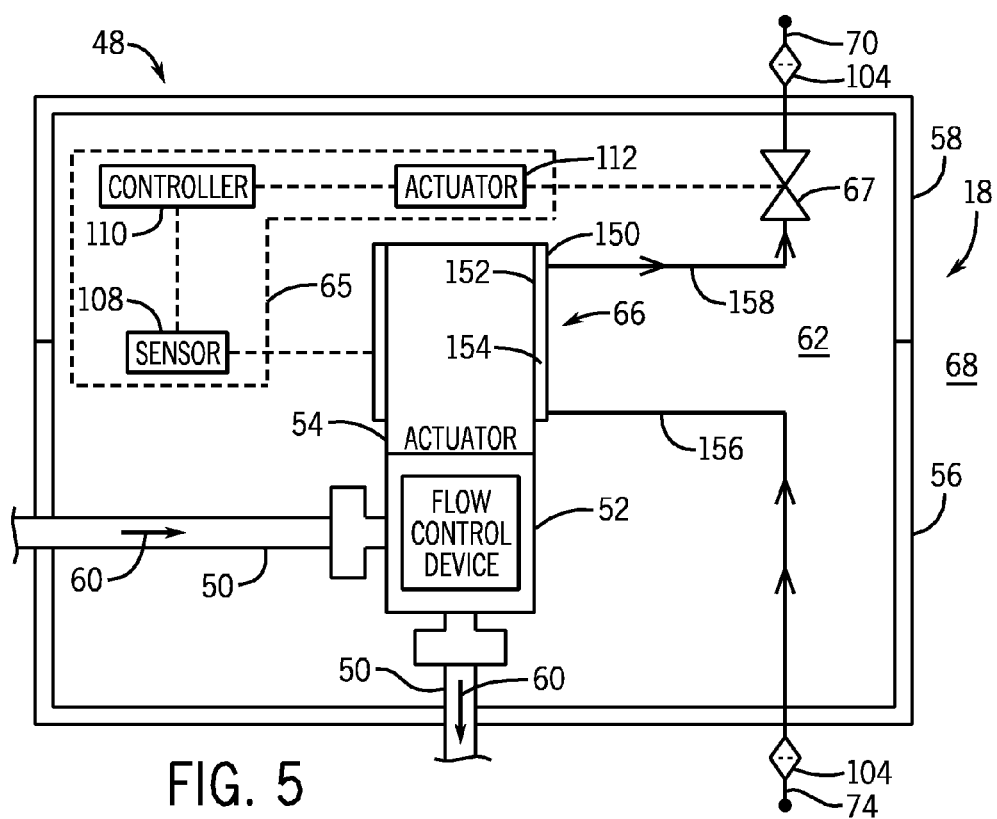
FIG. 5 is a schematic of an embodiment of a thermal control system configured to control a temperature of an actuator coupled to a flow control device.

FIG. 5 is a schematic of the insulated structure 18 having the thermal control system 48, illustrating a jacket configuration of the heat exchanger 66 having a jacket configuration. The illustrated embodiment includes similar elements and element numbers as the embodiment shown in FIG. 3. In the illustrated embodiment, the heat exchanger 66 comprises a jacket 150 coupled to the actuator 54. As shown, the jacket 150 of the heat exchanger 66 is coupled to and disposed about a perimeter 152 of the actuator 54. The jacket 150 forms an annular passage 154 about the perimeter 152 of the actuator 54. The jacket 150 may be coupled to and extends around the actuator 54 by fasteners or by a joining process, such as brazing or welding. Alternatively, the jacket 150 may be integrally formed with the actuator 54. In other words, the jacket 150 may be a permanently fixed component (e.g., an internal cavity of a cast structure) of the actuator 54. In one embodiment, the jacket 150 may be formed from a thermally conductive metal, such as copper, steel or aluminum. In the illustrated embodiment, the jacket 150 receives a sea water flow from an inlet conduit 156 connected to the inlet port 74. Similarly, the sea water flows from the jacket 150 to the exit port 70 through an exit conduit 158.

In the manner described above, the thermostat 65 (e.g., controller 110) opens the valve 67 to open the exit port 70 when the actuator 54 reaches the predefined elevated temperature. The exterior sea water 68 enters the inlet conduit 156 through the inlet port 74 and flows into the jacket 150 of the heat exchanger 66. As the sea water flows through the jacket 150, the sea water absorbs heat from the actuator 54. More specifically, as sea water passes through the jacket 150 coupled to the actuator 54, the temperature difference between the sea water flowing through the jacket 150 and the actuator 54 will cause the sea water to absorb heat from the actuator 54. As heat from the actuator 54 is absorbed by the sea water flowing through the jacket 150, the temperature of the actuator 54 is lowered. As described above, once the actuator 54 reaches a predefined lowered temperature, the thermostat 65 (e.g., controller 110) closes the valve 67 to close the exit port 70, thereby stopping the flow of exterior sea water 68 through the jacket 150 of the heat exchanger 66. In this manner, the thermal control system 48 can maintain the temperature of the actuator 54 within a suitable temperature range (e.g., between upper and lower threshold temperatures).

Figure 6:
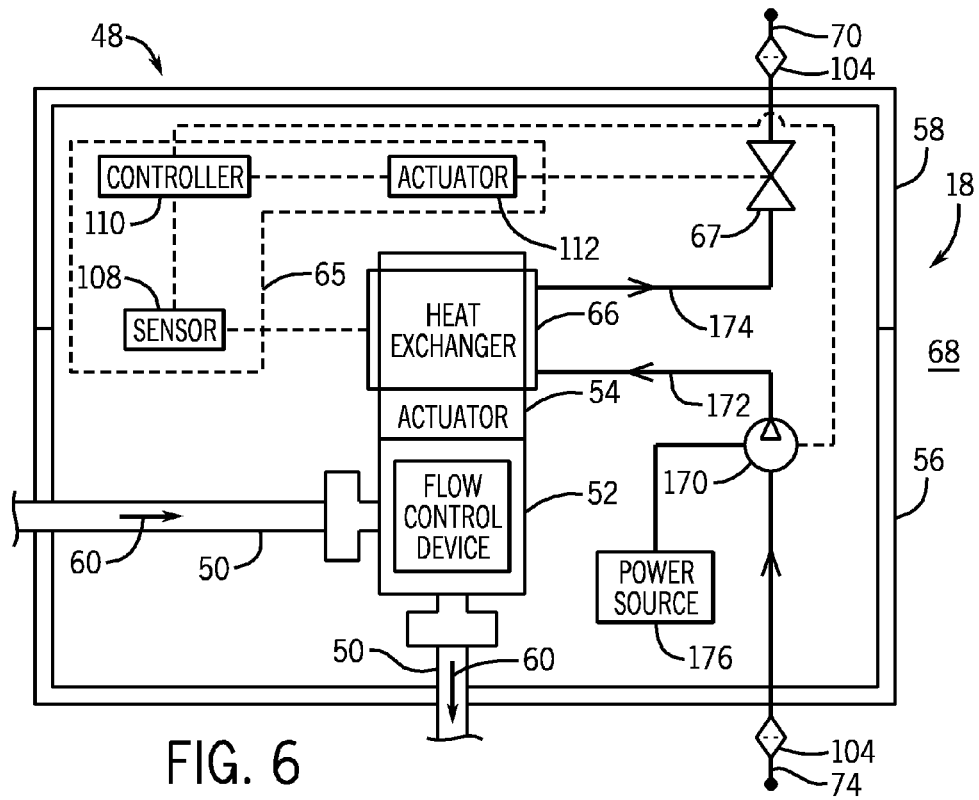
FIG. 6 is a schematic of an embodiment of a thermal control system configured to control a temperature of an actuator coupled to a flow control device.

FIG. 6 is a schematic of the insulated structure 18 having the thermal control system 48, illustrating a pump 170 of the system 48 configured to force a flow of sea water 68 through the heat exchanger 66. More specifically, the pump 170 is disposed along an inlet conduit 172 between the inlet port 74 and the heat exchanger 66. However, in other embodiments, the pump 170 may be disposed along an exit conduit 174 between the heat exchanger 66 and the exit port 70. The illustrated embodiment includes similar elements and element numbers as the embodiment shown in FIG. 3.

As shown, the operation of the pump 170 is regulated by the thermostat 65 (e.g., controller 110). Additionally, a power source 176 provides power to the pump 170. In operation, when the actuator 54 reaches the predefined elevated temperature, the thermostat 65 (e.g., controller 110) operates the actuator 112 to open the valve 67. Simultaneously, in the illustrated embodiment, the thermostat 65 (e.g., controller 110) operates the pump 170. In other words, the controller 170 turns the pump 170 on after or while concurrently opening the valve 67. As will be appreciated, when the valve 67 is closed, i.e., when the temperature of the actuator 54 is below the predefined elevated temperature, the pump 170 is not operating. When the pump 170 is turned on, the pump 170 operates to force sea water through the inlet conduit 172 from the inlet port 74 to the heat exchanger 66. In certain embodiments, the valve 67 may be excluded from the thermal control system 48, and the pump 170 may be placed in line with the exit conduit 174 to selectively enable and disable the flow of sea water. Alternatively, the valve 67 and the pump 170 may be integrated with one another. In the illustrated embodiment, the heat exchanger 66 may have any of a variety of configurations. For example, the heat exchanger 66 may have the fin 130 configuration, the coil 100 configuration, or the jacket 150 configuration described above.

Furthermore, the pump 170 enables an elevated flow rate of exterior sea water 68 through the heat exchanger 66. Without the pump 170, the flow of sea water through the heat exchanger 66 is driven by convection and buoyancy differences between the heated water within the heat exchanger 66 and the cold exterior sea water 68 entering the heat exchanger 66 through the inlet port 74, as described above. In the illustrated embodiment, the pump 170 provides an additional force to drive the exterior sea water 68 through the heat exchanger 66. In this manner, the flow rate of the exterior sea water 68 through the heat exchanger 66 is increased and, consequently, the rate of heat transfer between the actuator 54 and the heat exchanger 66 may increase. Furthermore, the thermostat 65 (e.g., controller 110) may be configured to regulate the speed of the pump 170 to vary the flow rate of the exterior sea water 68 through the heat exchanger 66, and therefore vary the rate of heat transfer from the actuator 54. Once the actuator 54 reaches a predefined lowered temperature, the thermostat 65 (e.g., controller 110) may selectively close the valve 67 to close the exit port 70 and turn off the pump 170, thereby stopping the flow of exterior sea water 68 through the heat exchanger 66. In this manner, the thermal control system 48 can maintain the temperature of the actuator 54 within a suitable temperature range (e.g., between upper and lower threshold temperatures).

Figure 7:
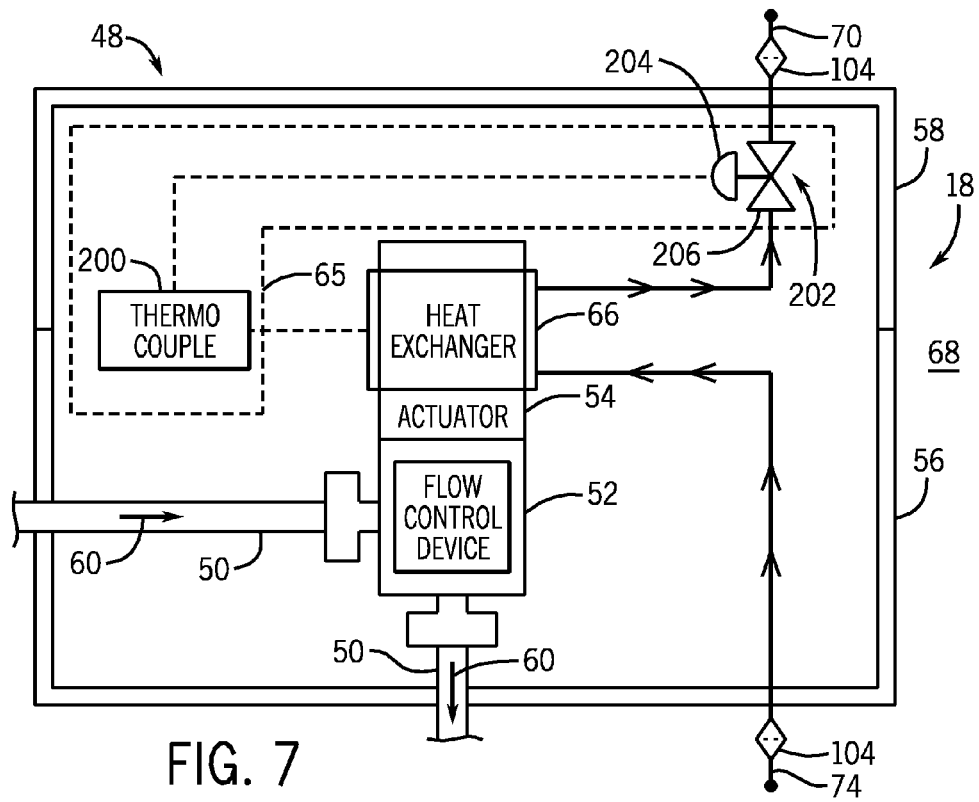
FIG. 7 is a schematic of an embodiment of a thermal control system configured to control a temperature of an actuator coupled to a flow control device.

FIG. 7 is a schematic of the insulated structure 18 having the thermal control system 48, illustrating an embodiment of the thermostat 65. Specifically, in the illustrated embodiment, the thermostat 65 includes a thermocouple 200 and a thermally actuated valve 202 having a thermal actuator 204 and a valve mechanism 206. The thermocouple 200 is coupled to the actuator 54 and is configured to measure the temperature of the actuator 54. When the actuator 54 reaches the predefined elevated temperature, the thermocouple 200 communicates the event to the thermally actuated valve 202. In response to the actuator 54 reaching the predefined elevated temperature, the thermal actuator 204 triggers the valve mechanism 206 of the thermally actuated valve 202. The valve mechanism 206 opens the exit port 70, allowing the sea water within the heat exchanger 66 to flow out of the heat exchanger 66 and allowing exterior sea water 68 to enter the heat exchanger 66 to absorb heat from the actuator 54, in the manner described above. Thereafter, when the actuator 54 has reached the predefined lowered temperature, the thermocouple 200 communicates the event to the thermally actuated valve 202, causing the valve mechanism 206 to close the exit port 70 and stop the flow of sea water through the heat exchanger 66. In this manner, the thermal control system 48 can maintain the temperature of the actuator 54 within a suitable temperature range (e.g., between upper and lower threshold temperatures).

As discussed above, embodiments of the thermal control system 48 monitor and control the temperature within the insulated structure 18, and particularly the temperature of the actuator 54. Moreover, the thermal control system 48 is configured to maintain the temperature of the actuator 54 within a predefined temperature range (e.g., between the predefined elevated temperature and the predefined lowered temperature). The regulation of the temperature of the actuator 54 helps prevent the actuator 54 from being exposed to elevated temperatures, which may cause the actuator 54 and its subcomponents to malfunction or fail. Additionally, while the embodiments of the thermal control system 48 discussed above are configured to maintain the temperature of the actuator 54 within a predefined temperature range, other embodiments of the thermal control system 48 may be configured to maintain the temperature of any component within the insulated structure 18.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
an underwater assembly, comprising:
a flow control device: and
an actuator coupled to the flow control device, wherein the actuator is configured to actuate the flow control device;
an insulated housing surrounding the flow control device and the actuator, wherein the insulated housing is configured to retain heat; and
a thermal control system comprising a heat exchanger coupled to the actuator, wherein the thermal control system is configured to control a temperature of the actuator, and the thermal control system comprises a controller configured to initiate a flow of fluid through the heat exchanger when a temperature of the actuator is at or above an upper threshold temperature and configured block the flow of fluid through the heat exchanger when the temperature of the actuator is at or below a lower threshold temperature.

2. The system of claim 1, wherein the heat exchanger comprises a heat exchanger volume isolated from an interior of the insulated housing, and the thermal control system is configured to circulate the fluid through the heat exchanger volume.

3. The system of claim 2, wherein the thermal control system comprises an inlet passage extending from an exterior through a wall of the insulated housing, through the interior of the insulated housing, and to an inlet of the heat exchanger.

4. The system of claim 3, wherein the thermal control system comprises an outlet passage extending from an outlet of the heat exchanger, through the interior of the insulated housing, and through the wall to the exterior of the insulated housing.

5. The system of claim 4, comprising a valve coupled to the outlet passage, wherein the thermal control system is configured to open or close the valve in response to at least one temperature threshold.

6. The system of claim 5, wherein the valve comprises a thermally actuated valve unit having a thermal actuator coupled to a valve mechanism, and the thermal actuator is configured to open or close the valve mechanism in response to the at least one temperature threshold.

7. The system of claim 5, wherein the thermal control system comprises an actuation system configured to open or close the valve in response to the at least one temperature threshold, wherein the actuation system comprises a temperature sensor, the controller, and an actuator.

8. The system of claim 2, wherein the heat exchanger comprises a coil disposed about the actuator, and the coil is configured to circulate the fluid.

9. The system of claim 2, wherein the heat exchanger comprises a plurality of fins coupled to the actuator and a conduit coupled to the plurality of fins, and the conduit is configured to circulate the fluid.

10. The system of claim 2, wherein the heat exchanger comprises a jacket disposed about and coupled to the actuator, and the jacket defines a volume configured to circulate the fluid.

11. The system of claim 2, wherein the thermal control system comprises a pump configured to force circulation of the fluid through the heat exchanger volume.

12. The system of claim 2, wherein the fluid comprises sea water that enters the heat exchanger volume from an exterior of the insulated housing.

13. The system of claim 1, wherein the actuator comprises an electromechanical actuator.

14. A system, comprising:
an underwater thermal control system, comprising:
a heat exchanger configured to control a temperature of an actuator disposed in an insulated housing;
an inlet passage configured to pass a water flow from an exterior of the insulated housing into the heat exchanger;
an outlet passage configured to pass the water flow from the heat exchanger to the exterior of the insulated housing;
a valve coupled to the outlet passage, wherein the valve is configured to open and close to control circulation of the water flow through the inlet passage, the heat exchanger, and the outlet passage; and
a controller configured to open the valve when a temperature of the actuator is at or above an upper threshold temperature and configured to close the valve when the temperature of the actuator is at or below a lower threshold temperature.

15. The system of claim 14, comprising a thermostat configured to measure the temperature of the actuator.

16. The system of claim 15, wherein the thermostat comprises a temperature sensor, the controller, and a valve actuator coupled to the valve.

17. The system of claim 16, wherein the thermostat is configured to operate a pump to force the water flow through the heat exchanger.

18. The system of claim 14, comprising a mineral extraction component having the actuator.

19. A method, comprising:
   sensing a temperature at or above an upper threshold temperature within an insulated underwater housing that contains an actuator coupled to a flow control device;
   initiating a flow of water from a surrounding water through a heat exchanger within the insulated underwater housing if the temperature is at or above the upper threshold temperature;
   sensing the temperature at or below a lower threshold temperature within the insulated underwater housing; and
   terminating the flow of water through the heat exchanger if the temperature is at or below the lower threshold temperature.

20. The method of claim 19, comprising maintaining the temperature of an underwater mineral extraction component within a temperature range, wherein the underwater mineral extraction component comprises the insulated underwater housing, the actuator, and the flow control device.

21. The method of claim 20, wherein initiating the flow of water comprises opening a valve to enable the flow by natural buoyancy and temperature differences between the heat exchanger and the water surrounding the insulated underwater housing.

* * * * *